(No Model.)

Z. O. CLEBERT.
PLOW.

No. 338,932. Patented Mar. 30, 1886.

WITNESSES
F. L. Durand
Edward Stanton

Zenon Amare Clebert
INVENTOR,
By Louis Bagger & Co.
Attorneys

UNITED STATES PATENT OFFICE.

ZENON OMARE CLEBERT, OF DONALDSONVILLE, LOUISIANA.

PLOW.

SPECIFICATION forming part of Letters Patent No. 338,932, dated March 30, 1886.

Application filed December 30, 1885. Serial No. 187,083. (No model.)

*To all whom it may concern:*

Be it known that I, ZENON OMARE CLEBERT, a citizen of the United States, and a resident of Donaldsonville, in the parish of Ascension and State of Louisiana, have invented certain new and useful Improvements in Plows; and I do hereby declare that the following is a full, clear, and exact description of the invention, which will enable others skilled in the art to which it appertains to make and use the same, reference being had to the accompanying drawings, which form a part of this specification, and in which—

Figure 1:
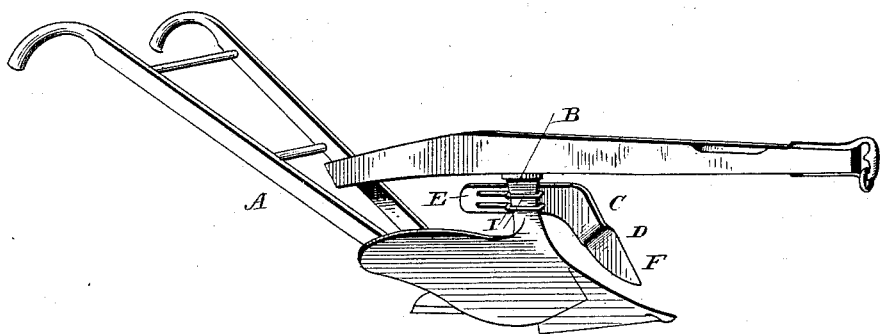
Figure 2:
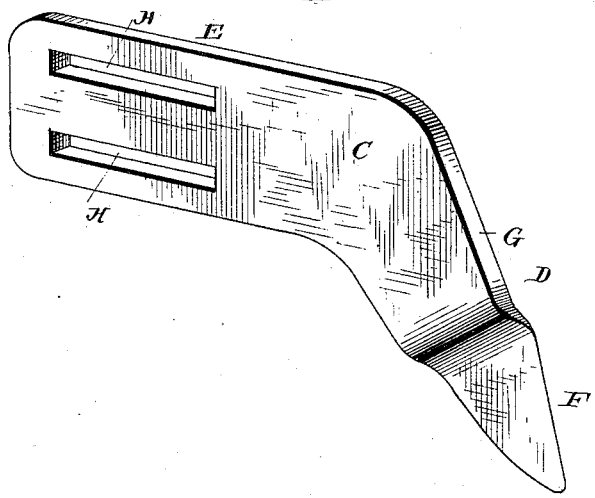

Figure 1 is a perspective view of a plow provided with my improved colter and fender, and Fig. 2 is a similar view of the colter and fender detached.

Similar letters of reference indicate corresponding parts in both the figures.

My invention has relation to colters and fenders for plows; and it consists in the improved construction and combination of parts of a device which may be adjustably and detachably secured to the forward standard of a plow, and which will serve as a colter and as a fender, as hereinafter more fully described and claimed.

In the accompanying drawings, the letter A indicates the plow, which may be of any suitable construction, and which is provided with the usual forward standard, B.

C is the device, which consists of a plate of steel or malleable iron or other suitable metal, and which is shaped to form a forwardly and downwardly inclined colter, D, and an upper body, E, the forward edge of the lower portion of the colter being sharpened, as shown at F. The colter portion of the device is reduced in thickness, and the sharpened edge F of the colter projects slightly forward of the upper blunt edge, G, of the device, which edge is curved slightly in at the place where the sharp edge stops, and forms a slightly-curved fender for plants, clods, or rubbish which may be in the path of the plow.

The body is formed with two or more longitudinal and horizontal slots, H H, and a corresponding number of U-shaped bails, I, are placed around the standard of the plow, projecting with their screw-threaded ends through the slots, and provided with nuts upon their outer ends, which nuts bear against the edges of the slots at the landside of the plow, clamping the device to the standard flush with the landside of the plow.

It will now be seen that as the plow is drawn through the ground the colter will cut the soil in the same manner as an ordinary colter, and that the upper blunt edge of the device will serve as a fender for plants, clods, or rubbish which may be in the way of the plow; and the entire body of the device being at the upper edge of the landside of the plow, and consequently covering the aperture between the upper portion of the plow-body and the standard forward of the same, clods and similar objects broken up by the plow will be prevented from falling to the landside and into the open furrow, but will cause them to be thrown by the mold-board upon the overturned furrow or slice of soil. This will be very advantageous where the plow is used for plowing the earth away from between the plants, the device preventing clods or stones loosened by the nose of the plow and point of the colter from being thrown or rolled over upon the plants, and thus injuring them, and the colter portion will operate in the same manner as a colter of the usual construction secured to the plow-beam.

It will be seen that the device may be adjusted up or down upon the standard, and that it may be adjusted forward or back, the bails sliding adjustably upon the standard and the device sliding with its slots upon the threaded ends of the bails.

Having thus described my invention, I claim and desire to secure by Letters Patent of the United States—

The combination, with a plow-standard, of a colter and fender consisting of a flat plate having slots in its rear portion, and the front portion of which is inclined downward and forward, and provided with a point, F, having a lateral inclination which is thinner than the rest of the plate, and which projects in front of and below the plate and has its front edge sharpened to act as a colter, as shown and described.

In testimony that I claim the foregoing as my own I have hereunto affixed my signature in presence of two witnesses.

ZENON OMARE CLEBERT.

Witnesses:
JULES O. AYROND,
CLEOPHAS A. OURSO.